UNITED STATES PATENT OFFICE.

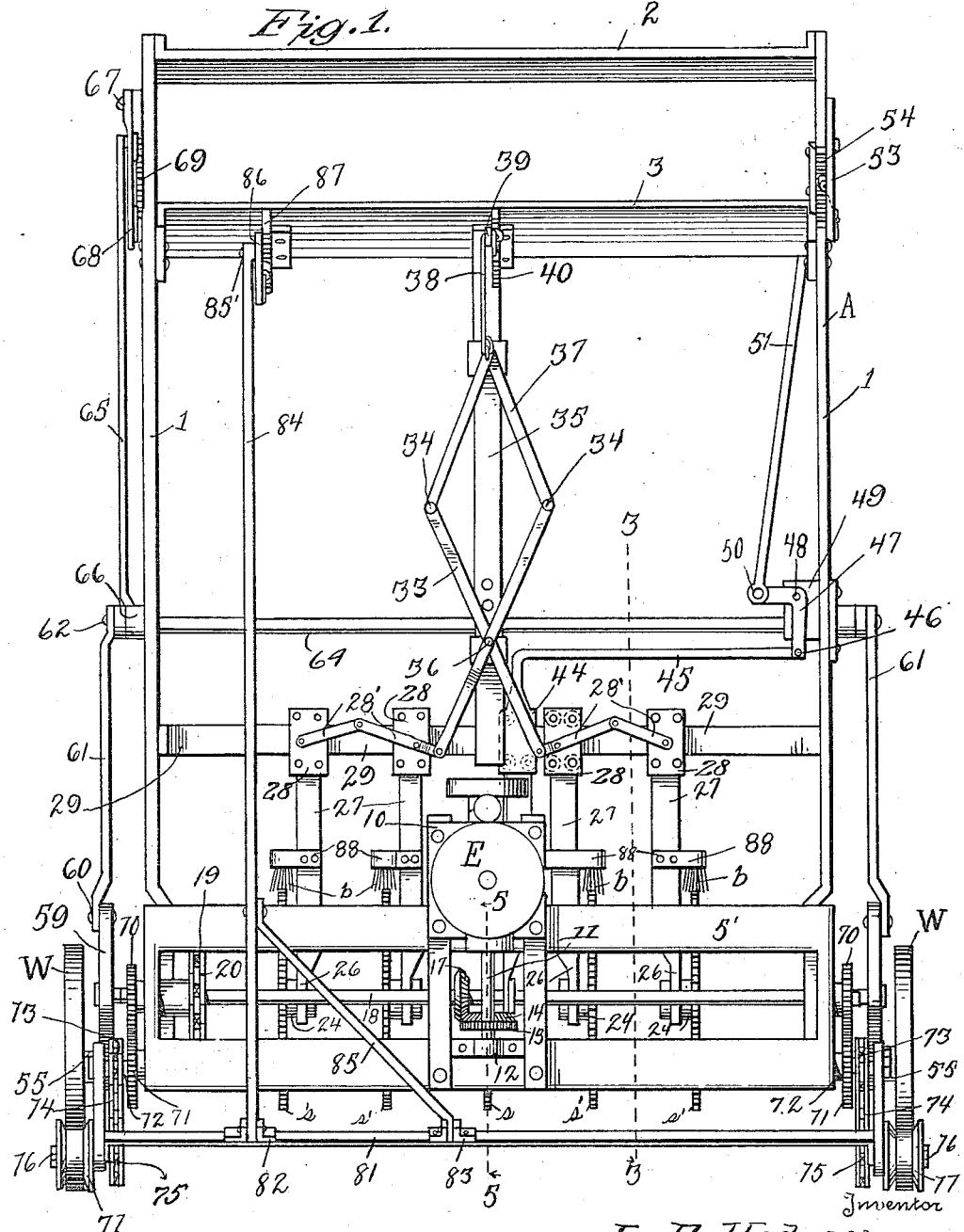

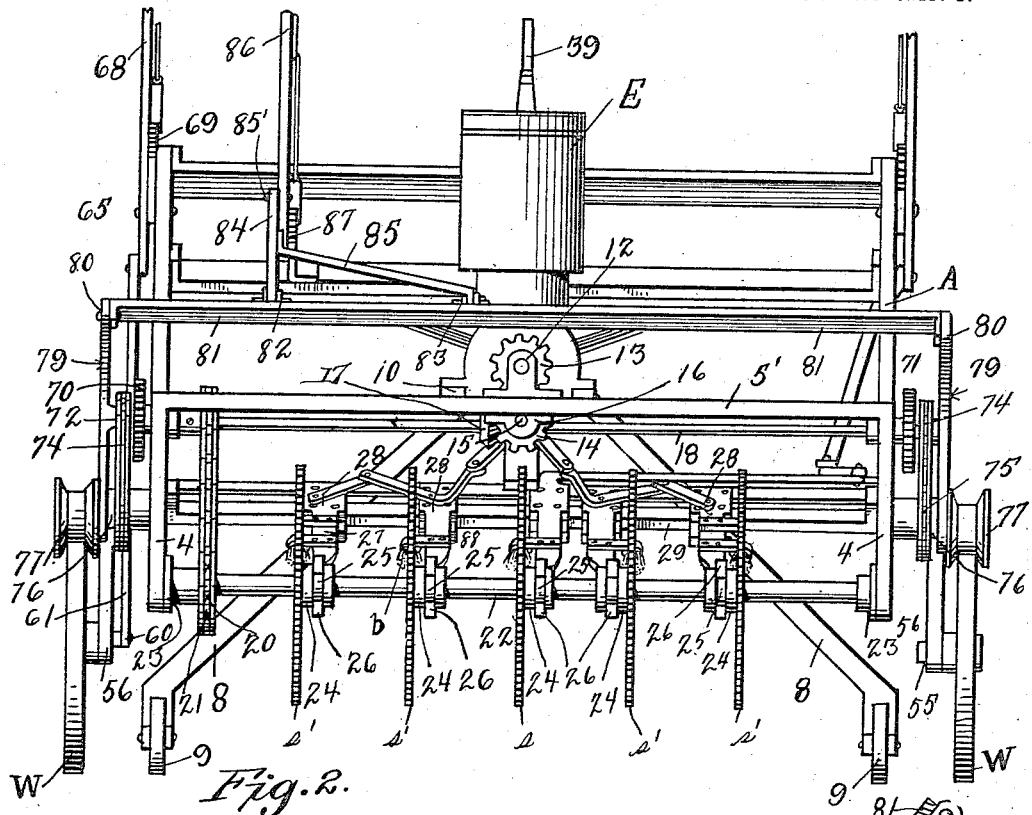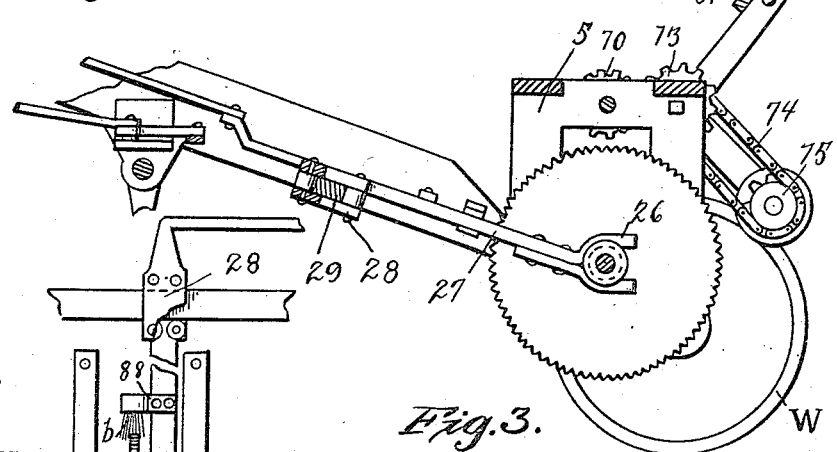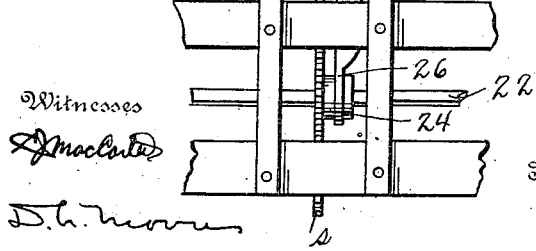

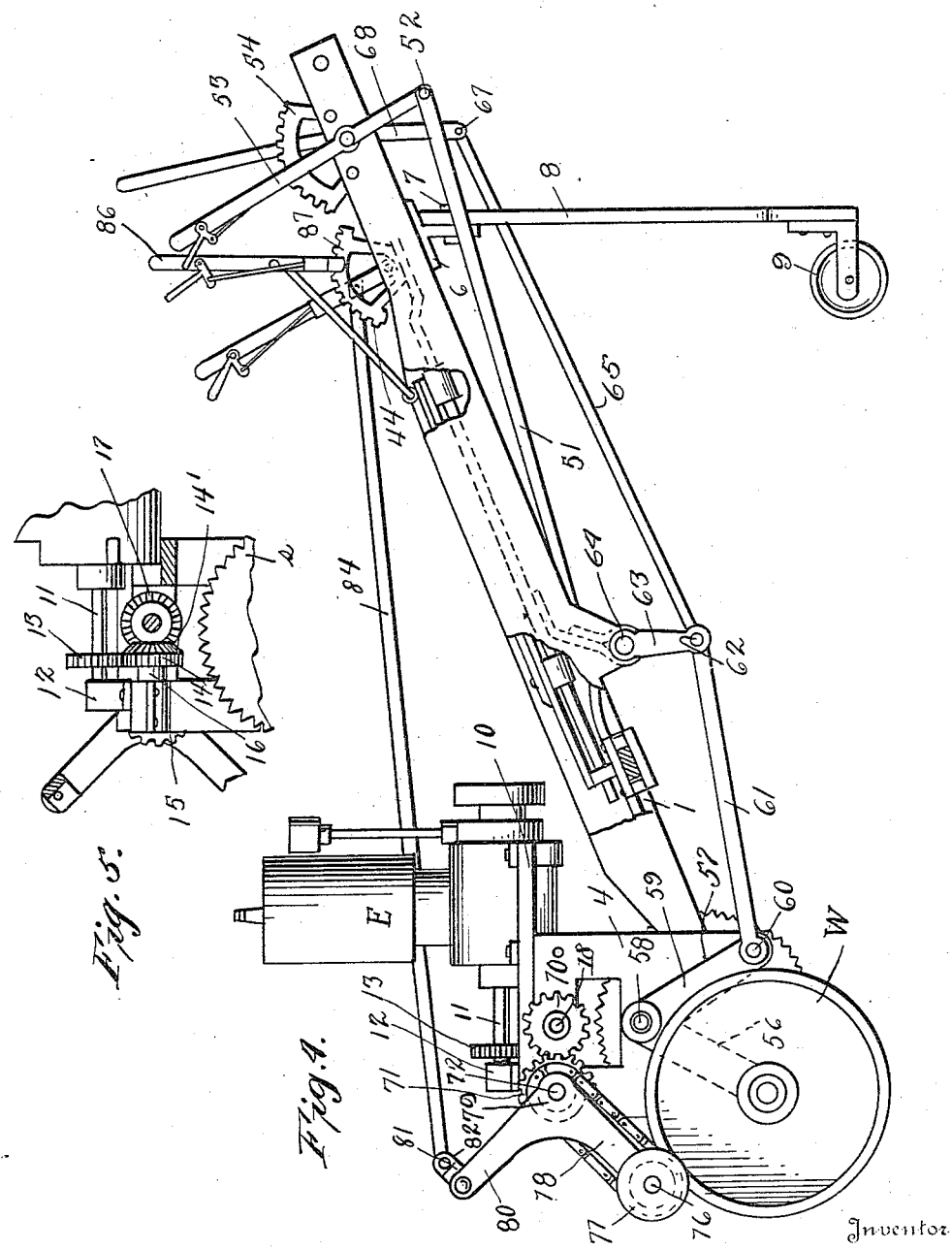

JAMES FREDERICK HODGSON, OF WINCHESTER, VIRGINIA.

ICE-CUTTING MACHINE.

1,265,781.      Specification of Letters Patent.     Patented May 14, 1918.

Application filed October 5, 1914, Serial No. 865,155. Renewed March 23, 1918. Serial No. 224,393.

*To all whom it may concern:*

Be it known that I, JAMES FREDERICK HODGSON, a citizen of the United States, residing at Winchester, in the county of Frederick, State of Virginia, have invented certain new and useful Improvements in Ice-Cutting Machines; and I do hereby declare the following to be a full, clear, and exact description of the invention, such as will enable others skilled in the art to which it appertains to make and use the same.

This invention relates to certain novel and useful improvements in ice cutting machines adapted for use in cutting large cakes of ice into smaller blocks or pieces.

In the present instance I have shown and described a machine which is especially adapted for use in ice manufacturing plants and ice houses for cutting the cakes into blocks, but I wish it to be understood that such a machine is not limited to this particular purpose, as it may be readily adapted for cutting field ice.

In carrying out my invention it is my purpose to provide a machine by means of which a large cake or piece of ice may be quickly and readily cut into blocks of predetermined, and if desired, uniform size, and without the expenditure of time and labor ordinarily incident to the cutting process.

Still a further object of my invention is the provision of a machine of this character, having a series of cutters, which may be so adjusted as to enable the operator to cut a cake of ice into blocks of predetermined dimensions or size.

Another object of the invention is the provision of a motor driven ice cutting machine wherein the manual labor is reduced to a minimum, while the speed of cutting is greatly increased.

I also propose to provide a machine which will embody the desired features of efficiency, durability, economy and convenience.

With the above recited objects and others of a similar nature in view, my invention consists in the construction, combination and arrangement of parts set forth in and falling within the scope of the appended claims.

In the accompanying drawings:

Figure 1 is a top plan view of an ice cutting machine embodying my invention.

Fig. 2 is a rear view thereof.

Fig. 3 is a cross sectional view taken on the line 3—3 of Fig. 1 and looking in the direction of the arrow.

Fig. 4 is a view in side elevation.

Fig. 5 is a sectional view taken on the line 5—5 of Fig. 1.

Fig. 6 is a detail plan view of a portion of the shipper lever for moving the middle saw or cutter.

Before entering into a detailed description of my invention, I will state briefly that it embraces, among other features, a wheeled frame in which is supported a shaft carrying a series of cutting disks in the form of rotary saws. These saws are mounted upon the shaft and mechanism is provided by means of which the saws may be shifted along the shaft to bring them closer to each other, or move them farther away so that the ice may be cut into blocks of various sizes as desired. Furthermore, provision is made for lowering the saws into cutting contact with the block of ice and elevating such saws from the ice as may be desired. Power for driving the saws and propelling the entire machine is provided through the medium of a motor and suitable mechanism for transmitting power from the motor to the saws and to the propelling or traction wheels of the machine.

Referring now to the accompanying drawings in detail, the letter A indicates the frame as an entirety, this frame in the present instance being composed of the side bars 1—1 connected by the cross bars 2 and 3, the rear ends of the side bars being bolted to the vertical frame 5 which may be considered as forming the rear part of the frame A. To the cross bar 3 of the frame is bolted a bracket 6, having pivotally connected therewith as at 7, the upper end of the yoke-like frame 8, the lower ends of which carry the ground casters 9. It will be seen by reference to Fig. 4 that these casters form traction wheels for the frame and that the latter is inclined or tilted upward from the rear to the front. Mounted on the platform 5' of the frame is the engine bed 10, carrying the engine or motor E which may be of any suitable character or type. The engine shaft 11 is journaled at its outer end in a bearing 12 on the platform 5', and this engine or power shaft carries a gear wheel 13 which meshes with the gear wheel 14 carried by the stud shaft 15 mounted in the bearings 16 bolted to the platform 5'. This gear 14 has a bevel face 14' which meshes with the bevel gear 17 on the counter shaft 18, this counter shaft extending across the machine and being journaled at its ends in the sides 4 of the platform 5'. This counter shaft 18 is provided with a sprocket wheel 19 over which runs the endless chain 20, driving the sprocket wheel 21, thus turning the saw or cutter shaft 22 on which the sprocket 21 is mounted. This cutter shaft 22 is journaled in bearings 23 carried at the lower ends of the sides 4. Adjustably mounted upon this saw shaft are the cutting saws or disks of the machine, and in the present instance I have shown five of these saws, a central saw $s$ and a pair of side saws $s's'$ at each side of the central saw. It is to be understood that these saws are shiftable longitudinally or along the saw shaft for the purpose of widening or narrowing the cuts to be made in the ice, and in the structure shown the central saw is adapted to be adjusted or shifted independently of the pairs of side saws. Each saw is provided with a collar 24 by means of which the saw is connected with the shaft, and each collar is circumferentially grooved at 25 for the reception of the shipping yoke 26 carried by the shipper bars 27. The upper end of each shipper bar carries a boxing 28 loosely embracing the cross bar 29, the arrangement being such that each bar 27 may slide upon this bar.

Pivotally connected to the bars 27 of the outer saws are bell crank levers 30 which are pivoted to the bar 29 at 31 and pivotally connected to these levers 30 are links 31' having slots 32 in their ends. These links 31' cross each other and are pivotally connected to the upper ends of levers 33, as at 34, the pivots 34 passing through the slots 32 and forming a sliding connection.

The levers 33 are crossed and pivoted together and to a bar 35, as at 36, the other ends of the said levers 33 being secured to the boxes 28 of the central pair of saws by links 28'.

Links 37 are pivoted to the other ends of the levers 33, converge and are pivoted together and to a link 38 which is connected to a lever 39 operable on a quadrant 40.

Thus it may be seen that as the lever 39 is moved in one direction the levers 33 are moved about their pivot and spread the bars 27 of the central saws at which time the pivots 34 ride in the slots 32 allowing the outer saws to remain stationary.

However, when the lever 39 is shifted farther the pivots 34 reach the ends of the slots 32 and any further movement will spread the outer saws through the bell crank levers 30. The saws may be moved inwardly, of course, by operating the lever 39 in the opposite direction.

In order to shift the central saw $s$ longitudinally of the saw shaft, I connect to the forward end of the lever 27 of this saw, the laterally turned end 44 of the link bar 45, said bar extending transversely of the machine and being pivotally connected at its other end as at 46 to the right angle lever 47 which is pivoted at 48 to a bracket 49 at the side of the machine. The opposite end of this angular lever 47 has connected thereto at 50 one end of an operating lever 51, the opposite end of which is connected at 52 to the quadrant lever 53 which works over the toothed quadrant 54 connected to the side of the frame of the machine. It will be seen that as the lever 53 is swung in one direction, the saw will be shifted in one direction on the saw shaft, while when this lever is moved in the opposite direction, the saw will be shifted in the opposite direction along the saw shaft. By the above-described arrangement of shifting the saws longitudinally of the shaft, provision is made for cutting cakes of ice into blocks of different dimensions. For instance, if it is desired to use only the middle or central saw or cutting disk members, the pairs of side disks may be shifted along the shaft away from the center disks so that these side disks will straddle and lie at opposite sides of the blocks of ice and only the center disk will rest thereon. Or, if it be desired, all of the disks may be shifted along the shaft to any position therealong to make cuts, as many as may be desired in the block of ice at points previously determined upon.

In order that the outer saws may be held in their adjusted positions I have pivotally secured links 28' to the inner and outer pairs of bars 27 and pivoted these links 28' together so that when the outer saws are extended the links 31' will not ride back on the pins 34.

In order that the saws may at desired times be held clear of the ice, I provide means whereby the rear end of the frame may be raised and lowered, as follows: The traction wheels of the machine are indicated at W, these wheels being mounted on short stud shafts 55 journaled in the ends of the arms 56 of the angular hangers 57 pivoted at 58 to the sides 4 of the platform frame. The arm 59 of each hanger has pivotally connected to its free end, as at 60, one end of a link bar 61, the forward ends of such link bars being pivotally connected as at 62 to the crank arms 63 depending from the rock shaft 64. This rock shaft is oscillated by means of a rod 65 connected therewith at 66, and having its forward end pivoted as at 67 to the lower end of the quadrant lever 68 working over the quadrant rack 69. From this arrangement it will be seen that when the quadrant lever 68 is actuated the traction wheels may be raised and lowered, and consequently the frame likewise raised and lowered to bring the saws into and out of contact with the ice.

In cutting a cake of ice, the machine is designed to straddle the same with the wheels W—W resting on the floor and the cutting saws in contact with the ice.

In order to propel the machine, I mount upon the counter shaft 18 adjacent the ends thereof, the gears 70 meshing with similar gears 71 carried by the stud shaft 72. On these stud shafts 72 are mounted sprockets 73 and driving chains 74 which run over and drive the sprockets 75 carried by the stud shafts 76 of the friction drive rollers 77, these rollers being grooved to receive in driving contact the peripheries or elements of the wheels W. From this it will be seen that motion is transmitted from the engine E to the driving rollers 76 and the latter frictionally engaging the wheel W to drive these wheels to propel the machine. For the purpose of moving the friction rollers 77 into and out of driving engagement with the traction wheels, I mount the stud shafts 76 of these rollers in the ends of the arms 78 of bell crank hangers 79 on the stud shafts 72. The arms 80 of these bell crank levers are connected by a cross bar 81 carrying brackets 82 and 83, to the bracket 82 of which is pivotally connected an operating lever 84, a diagonal rod 85 connecting this operating rod with the bracket 83. The forward end of the operating rod 84 is pivoted as at 85′ to the quadrant lever 86 engageably with the quadrant rack 87 in the usual manner, this rack being bolted to the cross bar 83.

From this it will be seen that when the lever 86 is pushed forward to draw the rod 84 forward, the bell cranks are rocked upward upon their stud shafts and the friction rollers drawn out of contact with the ground wheels. Likewise when the movement of the quadrant lever is reversed to push the rod 81 downward the friction rollers are lowered into driving engagement with the traction wheels.

For the purpose of clearing the saws from fine ice which may collect in the teeth thereof, I provide suitable brushes $b$ which are fastened to brackets 88 extending laterally from the shipper levers 27, these brushes bearing lightly against the periphery of the cutter and brushing the fine ice from between the teeth thereof.

From the above description, taken in connection with the accompanying drawings, the construction and manner of employing my invention will be readily apparent to those skilled in the art.

It will be seen that by the use of my machine the saws may be adjusted along the saw shaft and spaced a desired distance apart so as to make parallel cuts along the ice, the distance between the cuts being determined, of course, by the adjustment of the saws on the shaft. Furthermore, it will be seen that by raising and lowering the traction wheels the rear end of the frame may be raised and lowered to move the saws into and out of contact with the ice, and that the machine is propelled by contact of the friction rollers with the traction wheels, the propelling mechanism being driven from the same engine which drives the other parts of the machine.

While I have herein shown and described one particular embodiment of my invention, I wish it to be understood that I do not confine myself to all the precise details of construction herein set forth by way of illustration, as modification and variation may be made without departing from the spirit of the invention or exceeding the scope of the appended claims.

What I claim is:

1. In an ice cutting machine, the combination with a wheeled frame and a motor mounted thereon, of a saw shaft extending transversely of the frame, driving connections between the motor and the saw shaft, a circular saw mounted centrally of the shaft, a plurality of saws mounted on the shaft at each side of the center saw, means common to all of the side saws for adjusting the latter longitudinally of the shaft, and independent means for shifting the central saw longitudinally on the shaft.

2. In an ice cutting machine, the combination with a wheeled frame, of a saw shaft mounted thereon, a series of circular saws mounted on the saw shaft, a shipper lever for each saw, a guide bar extending across the frame and along which the shipper levers are adapted to slide, and means including an operating lever, and link connections between the operating lever and the shipper levers for shifting the latter transversely of the machine to move the saws longitudinally along the saw shaft.

3. In an ice cutting machine, the combination with a frame, of a saw shaft mounted in the frame, a cutter mounted on the shaft at substantially the center thereof, cutters also mounted on the shaft at each side of the center cutter, means common to the side cutters for adjusting the latter longitudinally of the shaft, and mechanism for adjusting the center cutter on the shaft relative to the side cutter.

In testimony whereof, I affix my signature, in the presence of two witnesses.

JAMES FREDERICK HODGSON.

Witnesses:
ROBT. M. WARD,
KATHRYN A. McFADDEN.